United States Patent
Chang et al.

(10) Patent No.: US 10,270,558 B2
(45) Date of Patent: Apr. 23, 2019

(54) MAXIMUM LIKELIHOOD DETECTOR AND DETECTING METHOD, AND WIRELESS SIGNAL RECEIVER WITH MAXIMUM LIKELIHOOD DETECTION FUNCTION

(71) Applicant: REALTEK SEMICONDUCTOR CORPORATION, Hsinchu (TW)

(72) Inventors: Chung-Yao Chang, Hsinchu County (TW); Wei-Chieh Huang, Hsinchu County (TW); Yi-Syun Yang, Kinmen County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/465,209

(22) Filed: Mar. 21, 2017

(65) Prior Publication Data

US 2017/0317786 A1 Nov. 2, 2017

(30) Foreign Application Priority Data

May 2, 2016 (TW) .............................. 105113638 A (51) Int. Cl.
*H04L 1/00* (2006.01)
*H04L 27/38* (2006.01)
(Continued)

(52) U.S. Cl.
CPC ...... *H04L 1/0054* (2013.01); *H04L 25/03229* (2013.01); *H04L 25/03961* (2013.01); *H04L 25/067* (2013.01); *H04L 27/38* (2013.01)

(58) Field of Classification Search
CPC .......... H03D 1/00; H03D 3/22; H03M 13/41; H04B 1/10; H04B 7/02; H04B 7/08;
(Continued)

(56) References Cited

U.S. PATENT DOCUMENTS 9,008,240 B1 * 4/2015 Wan ..................... H04L 1/0054
375/262
2006/0203708 A1 * 9/2006 Sampath .............. H04B 7/0417
370/208
(Continued)

FOREIGN PATENT DOCUMENTS

CN 101582748 A 11/2009

OTHER PUBLICATIONS

English abstract translation of CN patent 101582748A.
(Continued)

*Primary Examiner* — Shawkat M Ali
(74) *Attorney, Agent, or Firm* — WPAT, PC (57) ABSTRACT

The present disclosure includes an ML (Maximum Likelihood) detector. An embodiment of the ML detector comprises a search value selecting circuit and an ML detecting circuit. The search value selecting circuit is configured to select a search value according to a communication index and a modulation type or determine the search value according to a predetermined value, in which the communication index is related to a reception signal or a derivative thereof, the search value is associated with a search range, and a number of candidate signal value(s) in the search range is not greater than a number of all candidate signal values of the modulation type. The ML detecting circuit is configured to execute an ML calculation according to the search value and one of the reception signal and the derivative thereof, so as to calculate a log likelihood ratio of every candidate signal value in the search range.

19 Claims, 8 Drawing Sheets

(51) Int. Cl.
  *H04L 25/03* (2006.01)
  *H04L 25/06* (2006.01)
(58) Field of Classification Search
  CPC .... H04B 7/0413; H04B 7/0845; H04B 17/21;
      H04B 17/336; H04L 1/00; H04L 1/02;
      H04L 1/0054; H04L 5/0048; H04L 25/02;
      H04L 27/00; H04L 27/06; H04L 27/28;
      H04L 27/34; H04L 27/38; H04L 27/265;
      H04L 27/2695
  USPC ....... 375/260, 262, 267, 332, 341, 346, 348;
      714/776, 794
  See application file for complete search history.

(56) References Cited

U.S. PATENT DOCUMENTS

| | | | | |
|---|---|---|---|---|
| 2008/0279299 | A1* | 11/2008 | Reuven | H04L 25/03318 375/267 |
| 2009/0141835 | A1* | 6/2009 | Yang | H04L 25/03178 375/341 |
| 2009/0225878 | A1* | 9/2009 | Papadopoulos | H03M 13/2957 375/260 |
| 2010/0007555 | A1* | 1/2010 | Ezal | G01C 21/005 342/357.3 |
| 2010/0027693 | A1* | 2/2010 | Vijayan | H04L 5/0007 375/260 |
| 2010/0034321 | A1* | 2/2010 | Lee | H03M 13/41 375/341 |
| 2010/0091912 | A1* | 4/2010 | Park | H04L 25/03171 375/341 |
| 2011/0222618 | A1 | 9/2011 | Huss et al. | |
| 2013/0010905 | A1* | 1/2013 | Koike | H04L 1/0038 375/341 |

OTHER PUBLICATIONS

Massimiliano Siti et al., "A Novel Soft-Output Layered Orthogonal Lattice Detector for Multiple Antenna Communications", IEEE International Conference on Communications (ICC), 2006.

Taiwan Patent Office "Office Action" dated Jun. 29, 2018, Taiwan. Summary of the OA letter: References 1(US 20090141835A1) and 2 (CN 101582748A) render claims 1,2,5,8-10 obvious. References 1(US 20090141835A1), 2 (CN 101582748A) and 3(U.S. Pat. No. 9,008,240B1) render claims 3,4,6,7 obvious.

Taiwan Intellectual Property Office, "Office Action", dated Aug. 31, 2018. Summary of the OA letter: References 1(US 20090141835A1) , 2 (CN 101582748A) and 3(US 20110222618) render claim 4 obvious.

* cited by examiner

MAXIMUM LIKELIHOOD DETECTOR AND DETECTING METHOD, AND WIRELESS SIGNAL RECEIVER WITH MAXIMUM LIKELIHOOD DETECTION FUNCTION

BACKGROUND OF THE INVENTION

1. Field of the Invention

The present invention relates to wireless signal reception technique, especially to wireless signal reception technique using maximum likelihood detection.

2. Description of Related Art

Nowadays wireless communication technique is widely spread and users have more and more demand for data throughput. Therefore, this industry field keeps studying how to increase bandwidth usage efficiency under limited system bandwidth and raise system throughput. A market trend is using a spatial multiplexing transmission manner of multiple-input multiple-output (MIMO) technique which can greatly raise system throughput without engaging more bandwidth. This transmission manner gets a lot of attention recently.

The spatial multiplexing transmission manner uses a plurality of antennas of a transmitter to transmit signals independent of one another through the same frequency band at the same time, while a receiver uses a plurality of antennas to receive and detect these signals. In order to achieve better demodulation efficiency, the receiver may use a maximum likelihood algorithm (ML algorithm). The ML algorithm could be understood as an algorithm in search of an optimum solution. The ML algorithm makes use of an exhaustive search manner to estimate an optimum solution of transmission signals among all possible solutions according to reception signals. However, the exhaustive search manner is not an efficient manner because it computes all of the possible solutions and takes a long time to measure processing latency, complexity and computation power.

People who are interested in the prior arts may refer to the following literatures:
(1) China patent application of publication number CN101582748A; and
(2) Massimiliano Siti, Michael P. Fitz, "*A Novel Soft-Output Layered Orthogonal Lattice Detector for Multiple Antenna Communications*", IEEE International Conference on Communications (ICC), 2006.

SUMMARY OF THE INVENTION

In consideration of the problems of the prior arts, an object of the present invention is to provide a maximum likelihood detector, a maximum likelihood detecting method and a wireless signal receiver with a maximum likelihood detection function for making improvements over the prior arts.

The present invention discloses a maximum likelihood detector (ML detector). An embodiment of the ML detector comprises a search value selecting circuit and a maximum likelihood detecting circuit (ML detecting circuit). The search value selecting circuit is configured to select a search value according to a communication index and a modulation type or determine the search value according to a predetermined value, in which the communication index is related to a reception signal or a derivative thereof. The ML detecting circuit is configured to execute a maximum likelihood calculation (ML calculation) according to the search value and one of the reception signal and the derivative thereof, so as to calculate a log likelihood ratio of every candidate signal value in a search range, wherein the search range is associated with the search value, and a number of the candidate signal value(s) in the search range is not greater than a number of all candidate signal values of the modulation type.

The present invention also discloses a maximum likelihood detecting method (ML detecting method). An embodiment of the ML detecting method comprises the following steps: selecting a search value according to a communication index and a modulation type or determining the search value according to a predetermined value, in which the communication index is related to a reception signal or a derivative thereof, the search value is associated with a search range, and a number of candidate signal value(s) in the search range is not greater than a number of all candidate signal values of the modulation type; and executing a maximum likelihood calculation (ML calculation) according to the search value and one of the reception signal and the derivative thereof.

The present invention further discloses a wireless signal receiver with a maximum likelihood detection function (ML detection function). An embodiment of the wireless signal receiver comprises: a Discrete Fourier Transform (DFT) circuit configured to convert a time-domain signal into a frequency-domain signal; a reference signal extraction circuit configured to generate an extraction reference signal according to the frequency-domain signal; a channel estimation circuit configured to generate an estimation signal according to the extraction reference signal; a data signal extraction circuit configured to generate an extraction data signal according to the frequency-domain signal; a signal detecting circuit configured to generate a detection signal according to the estimation signal and the extraction data signal; and a decoding circuit configured to generate a decoded signal according to the detection signal. An embodiment of the said signal detecting circuit includes a maximum likelihood detector (ML detector). The ML detector is configured to select a search value according to a communication index and a modulation type or determine the search value according to a predetermined value, and configured to execute a maximum likelihood calculation (ML calculation) according to the search value and one of the frequency-domain signal and a derivative thereof to generate the detection signal, in which the search value is associated with a search range and a number of candidate signal value(s) in the search range is not greater than a number of all candidate signal values of the modulation type.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 4b illustrates the detail of the embodiment of FIG. 4a.

DETAILED DESCRIPTION OF THE PREFERRED EMBODIMENTS

The following description is written by referring to terms acknowledged in this industrial field. If any term is defined in this specification, such term should be explained accordingly.

The present disclosure includes a maximum likelihood detector (ML detector), a maximum likelihood detecting method (ML detecting method) and a wireless signal receiver with a maximum likelihood detection function (ML detection function) configured to operate by bit in the manner of soft decision to output a log likelihood ratio (LLR) to a decoding circuit for error correction. On account of that some element of the ML detector and the wireless signal receiver of the present disclosure could be known, the detail of such element will be omitted, provided that this omission has little to do with the written description and enablement requirements. Besides, the method of the present disclosure can be in the form of firmware and/or software which could be carried out by the hardware of the present disclosure or the equivalent thereof. The present invention is applicable to multiple-dimension or multiple-layer signal reception such as signal reception of a multiple-input multiple output (MIMO) communication system. Communication technique using MIMO, for example, includes Long-Term Evolution (LTE) technique, Wireless Local-Area Network (WLAN) technique, Worldwide Interoperability for Microwave Access (WiMax) technique, etc. For the convenience of understanding, the embodiments in this specification are described in accordance with applications of LTE communication system; however, the present invention can be applied to other kinds of communication systems.

Figure 1:
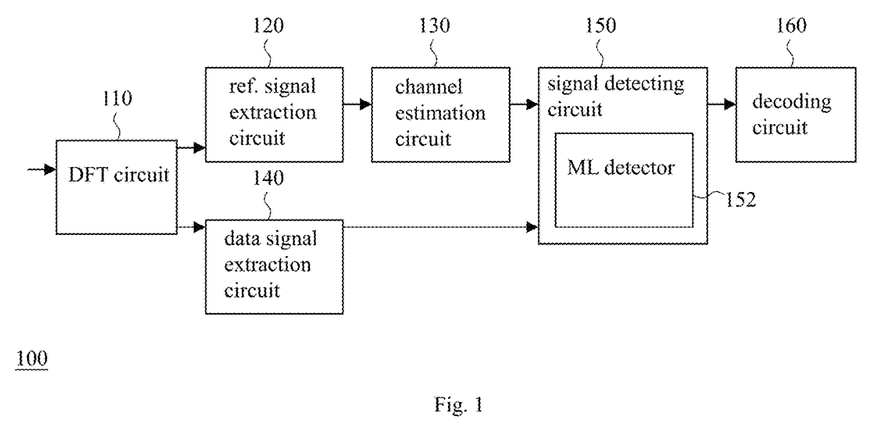
FIG. 1 illustrates an embodiment of the wireless signal receiver with a maximum likelihood detection function according to the present invention.

Please refer to FIG. 1. FIG. 1 illustrates an embodiment of the wireless signal receiver with the ML detection function according to the present invention. The wireless signal receiver 100 of FIG. 1 comprises: a Discrete Fourier Transform (DFT) circuit 110 configured to convert a time-domain signal into a frequency-domain signal; a reference signal (i.e., ref. signal in FIG. 1) extraction circuit 120 configured to generate an extraction reference signal according to the frequency-domain signal; a channel estimation circuit 130 configured to generate an estimation signal according to the extraction reference signal; a data signal extraction circuit 140 configured to generate an extraction data signal according to the frequency-domain signal; a signal detecting circuit 150 configured to generate a detection signal according to the estimation signal and the extraction data signal; and a decoding circuit 160 configured to generate a decoded signal according to the detection signal. An embodiment of the signal detecting circuit 150 includes a maximum likelihood detector (ML detector) 152. The ML detector 152 is configured to select a search value according to a communication index and a modulation type or determine the search value according to a predetermined value, and the ML detector is further configured to execute a maximum likelihood calculation (ML calculation) according to the search value and one of the frequency-domain signal and a derivative thereof to generate the detection signal, in which the search value is associated with a search range, and a number of candidate signal value(s) in the search range is not greater than a number of all candidate signal values of the modulation type. An embodiment of the decoding circuit 160 includes a descrambler and a turbo decoder, in which the descrambler is configured to generate a descrambled signal according to the detection signal and the turbo decoder is configured to generate the decoded signal according to the descrambled signal. Each of the DFT circuit 110, the reference signal extraction circuit 120, the channel estimation circuit 130, the data signal extraction circuit 140 and the decoding circuit 160 itself is a known or self-developed circuit.

On the basis of the above, the time-domain signal is converted into the frequency-domain signal through DFT, and the extraction data signal $Y_n$ of the $n^{th}$ sub-carrier in the frequency domain can be expressed by a $N_R \times 1$ vector as shown below:

$$Y_n = H_n X_n + W_n, \quad \text{(Eq. 1)}$$

in which $H_n$ stands for a $N_R \times N_T$ channel matrix from the $n^{th}$ sub-carrier's point of view, $X_n$ stands for the $N_T \times 1$ transmission signal of the $n^{th}$ sub-carrier, $W_n$ stands for the $n^{th}$ sub-carrier's noise, $N_R$ is the number of reception antenna(s), and $N_T$ is the number of transmission antenna(s). This embodiment takes the signal of a sub-carrier as a to-be-processed unit; for the convenience of expression, in the following description, the suffix n is omitted. In addition, this embodiment relates to an application of two-transmission two-reception spatial multiplexing transmission, that is to say both the number of independent spatial streams at a transmission end and the number of independent spatial streams at a reception end being two (while each of $N_R$ and $N_T$ is not less than two). Accordingly, Eq. 1 can be simplified as follows:

$$Y = HX + W \quad \text{(Eq. 2)}$$

In an LTE system, a reference signal (RS) and a data signal are carried by different sub-carriers, and thus the channel estimation circuit 130 derives a channel response matrix $\hat{H}$ of a target data signal based on channel estimation, which is estimated according to the reference signal, in the manner of interpolation or extrapolation; then the signal detecting circuit 150 performs QR decomposition or the equivalent thereof to the matrix $\hat{H}$ as shown below:

$$\hat{H} = QR, \quad \text{(Eq. 3)}$$

in which Q is a unitary matrix and R is an upper triangular matrix. After the QR decomposition or the equivalent thereof is done, the signal detecting circuit 150 multiplies the reception signal Y (i.e., the aforementioned extraction data signal) by $Q^H$ (i.e., Hermitian matrix of matrix Q) or executes an equivalent calculation to obtain a signal Z as follows:

$$Z = Q^H Y = Q^H (HX + W) = Q^H (QRX + W) = RX + W', \quad \text{(Eq. 4)}$$

in which $W' \equiv Q^H W$. Afterward, the ML detector 152 calculates a log likelihood ratio (LLR) by bit according to the signal Z of Eq. 4. The calculation could be expressed as follows:

$$L(b_i | Y) = \min_{\tilde{X} \in G(X_{b_i=1})} \|Z - R\tilde{X}\|^2 - \min_{\tilde{X} \in G(X_{b_i=0})} \|Z - R\tilde{X}\|^2, \quad \text{(Eq. 5)}$$

in which $b_i$ stands for $i^{th}$ bit, $G(X_{b_i=0})$ stands for a group of transmission signal(s) whose $i^{th}$ bit is/are 0, $G(X_{b_i=1})$ stands for a group of transmission signal(s) whose $i^{th}$ bit is/are 1, $\tilde{X}$ stands for candidate signal value(s) of the calculation process, and the symbol "~" is used to distinguish $\tilde{X}$ from a real signal X.

Figure 2:
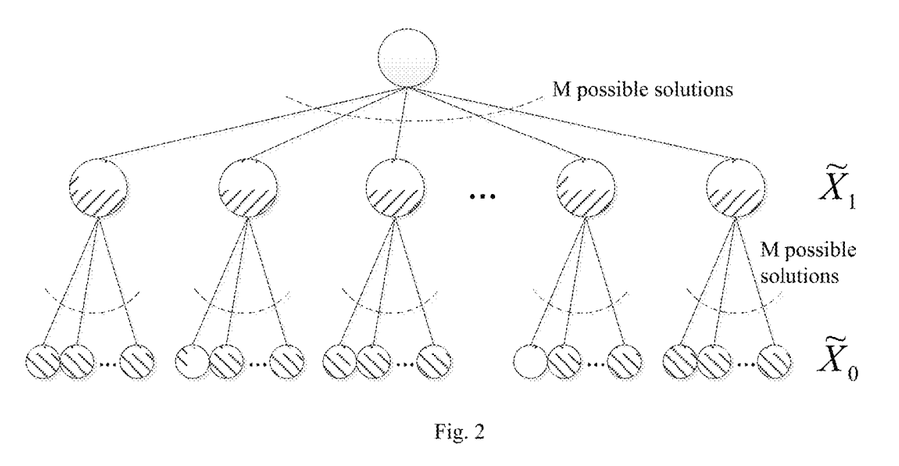
FIG. 2 shows a tree diagram of exhaustive search.

Eq. 5 can be regarded as an equation in search of an optimum solution, and the optimum solution can be found through exhaustive search as mentioned in the description of related art. If the modulation type of a transmission signal is M-QAM (i.e., quadrature amplitude modulation with a signal set of size M (which implies that the number of constellation points in a constellation diagram corresponding to such modulation type is M)), for two-layer independent data streams of two-transmission two-reception, the number of possible solutions of Eq. 5 (i.e., candidate signal value(s)) is $M^2$ which can be illustrated by a tree diagram as shown in FIG. 2.

In detail, since R is an upper triangular matrix, the operation in search of $$\min_{\tilde{X}} \|Z - R\tilde{X}\|^2$$

can be simplified. Firstly, $$\min_{\tilde{X}} \|Z - R\tilde{X}\|^2$$

can be decomposed as follows:

$$\min_{\tilde{X}} \|Z - R\tilde{X}\|^2 = \min_{\tilde{X}} \left\| \begin{bmatrix} Z_0 \\ Z_1 \end{bmatrix} - \begin{bmatrix} R_{00} & R_{01} \\ 0 & R_{11} \end{bmatrix} \begin{bmatrix} \tilde{X}_0 \\ \tilde{X}_1 \end{bmatrix} \right\|^2 = \min_{\tilde{X}} \left[ |Z_0 - R_{00}\tilde{X}_0 - R_{01}\tilde{X}_1|^2 + |Z_1 - R_{11}\tilde{X}_1|^2 \right]$$

(Eq. 6)

Figure 3:
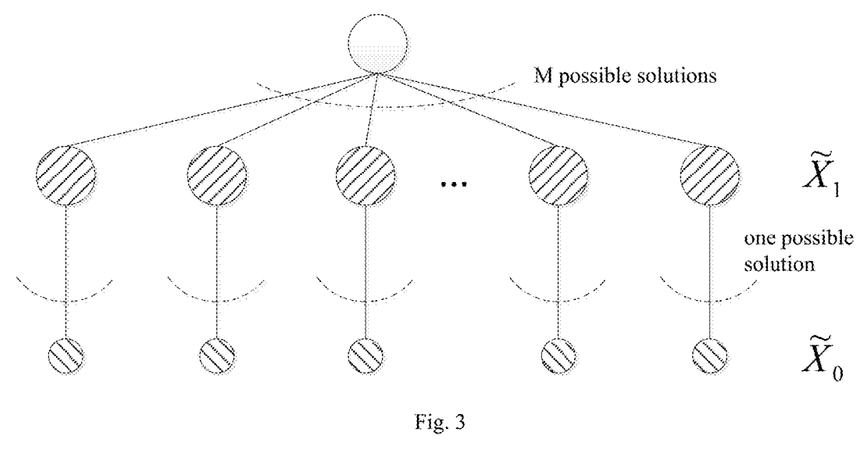
FIG. 3 shows a tree diagram under a configuration of a Layer Orthogonal Lattice Detector.

Since the square of an absolute value is not less than zero, $\|Z-R\tilde{X}\|^2$ will be the minimum with a selected $\tilde{X}_1$ when the following equation is true:

$$\tilde{X}_0 = \Gamma\left[\frac{Z_0 - R_{01}\tilde{X}_1}{R_{00}}\right],$$ (Eq. 7)

in which $\Gamma[\ ]$ stands for a quantizer. In other words, after $\tilde{X}_1$ is selected, the one and only solution derived from Eq. 7 is $\tilde{X}_0$. The configuration associated with Eq. 6 and Eq. 7 is called a Layer Orthogonal lattice Detector (LOAD). Under such configuration, a tree diagram for search can be greatly simplified as shown in FIG. 3. In a LOAD configuration corresponding to FIG. 3, at the first layer are unfolded all possible solutions (M possible solutions) of $\tilde{X}_1$, and at the second layer is derived $\tilde{X}_0$ according to Eq. 7 directly; accordingly, there is no need to unfold all possible solutions of $\tilde{X}_0$ in comparison with FIG. 2. As a result, the whole computation complexity is up to the number of possible solutions of $\tilde{X}_1$ unfolded at the first layer.

A log likelihood ratio (LLR) of every bit can be obtained through the calculation of Eq. 5 associated with the LOAD configuration corresponding to FIG. 3; afterward these LLRs are inputted to a decoder for error correction so as to complete a reception process. However, take M-QAM; the number of possible solutions (i.e., the number of $\tilde{X}_1$ unfolded at the first layer in FIG. 3) is M, while some of the possible solutions is unlikely to be correct and better to be removed from consideration for simplifying calculation. Therefore, the ML detector 152 of FIG. 1 does not calculate LLRs of the M possible solutions, but selects/determines a search value first and then executes an ML calculation according to the search value and one of the frequency-domain signal and the derivative thereof (e.g., the aforementioned extraction data signal) to generate the detection signal including LLR(s) as described in the preceding paragraph, in which the search value is associated with a search range, and the number of candidate signal value(s) in the search range (that is to say the number of constellation points within the search range in a constellation diagram corresponding to the modulation type) is not greater than the number of all candidate signal values of the modulation type (that is to say the number of all constellation points in the constellation diagram corresponding to the modulation type). In other words, the ML detector 152 in FIG. 1 unfolds only K possible solution(s) of $\tilde{X}_1$ (or $\tilde{X}_0$) at the first layer, and since K≤M, lower computation complexity and power consumption can be realized without substantially reducing performance. It should be noted that the ML detector 152 may unfold possible solutions of $\tilde{X}_0$ (at the first layer) firstly and then unfold possible solutions of $\tilde{X}_1$ (at the second layer). Such choices of modifications depend on implementer's discretion.

Figure 4A:
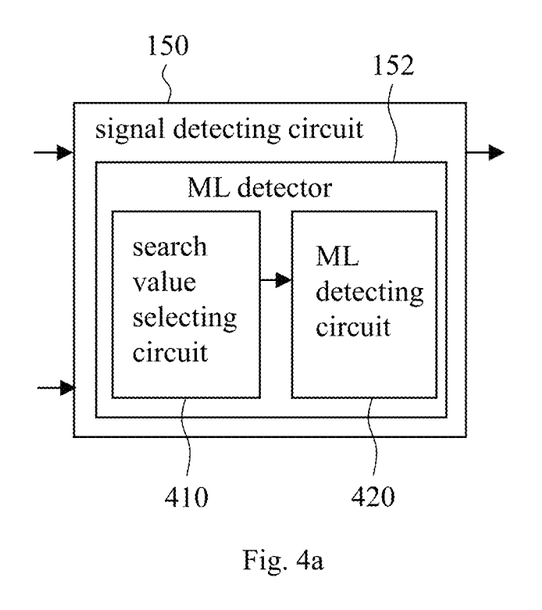
FIG. 4a illustrates an embodiment of the maximum likelihood detector of the present invention.

In detail, FIG. 4a illustrates an embodiment of the ML detector 152 including a search value selecting circuit 410 and a maximum likelihood detecting circuit (ML detecting circuit) 420. The search value selecting circuit 410 selects a search value according to a communication index and a modification type or determines the search value according to a predetermined value, in which the communication index is an index of a reception signal (e.g., the aforementioned frequency-domain signal) or an index of a derivative of the reception signal (e.g., the aforementioned extraction reference signal). The search value is associated with a search range, and the number of candidate signal value(s) in the search range is not greater than the number of all candidate signal values of the modulation type. The ML detecting circuit 420 executes an ML calculation according to the search value and one of the reception signal (e.g., the aforementioned frequency-domain signal) and a derivative thereof (e.g., the aforementioned extraction data signal) so as to calculate an LLR of every candidate signal value in the search range, in which the ML calculation, for example, includes the calculation of the aforementioned Eq. 5 and Eq. 7, the calculation of the following Eq. 8, and the following look-up-table operation or the equivalent thereof.

Figure 4B:
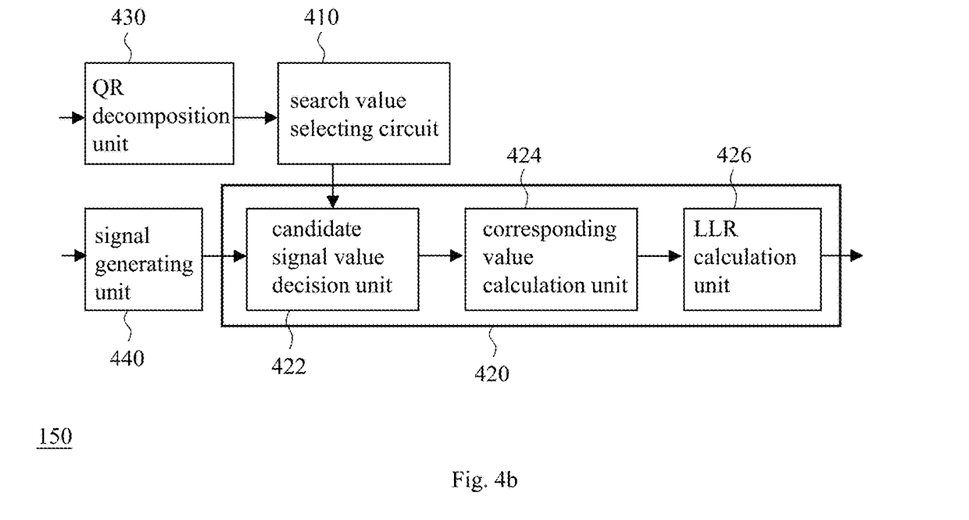

An exemplary implementation of the signal detecting circuit 150 of FIG. 4a is shown in FIG. 4b, including: a QR decomposition unit 430 configured to execute the calculation of Eq. 3 or the equivalent thereof according to the aforementioned estimation signal (associated with or equal to the channel response matrix $\hat{H}$); a signal generating unit 440 configured to execute the calculation of Eq. 4 or the equivalent thereof according to the aforementioned extraction data signal (associated with or equal to the aforementioned signal Y); the search value selecting circuit 410; and the ML detecting circuit 420. In FIG. 4b, the ML detecting circuit 420 includes: a candidate signal value decision unit 422 configured to execute the calculation of Eq. 8 or the equivalent thereof according to the extraction data signal so as to generate a computation result, and configured to execute the following look-up-table operation or the equivalent thereof according to the computation result and the search value so as to generate an operation result; and a corresponding value calculation unit 424 configured to execute the calculation of Eq. 7 or the equivalent thereof according to the operation result so as to generate a calculation result; and an LLR calculation unit 426 configured to execute the calculation of Eq. 5 or the equivalent thereof according to the calculation result. Each of the said QR decomposition unit 430 and signal generating unit 440 itself is a known or self-developed unit.

The ML detecting circuit 420 selects the search value, which is associated with the search range, according to the pinpoint of a reception signal mapped on a constellation diagram corresponding to the modulation type. Based on Eq. 6, an exemplary implementation of the ML detecting circuit 420 includes a zero-forcing (ZF) equalizer, which is included in the candidate signal value decision unit 422, to execute a ZF calculation as shown below for determining the pinpoint $\tilde{X}_{1,eq}$ of $\hat{X}_1$ mapped on a constellation diagram:

$$\tilde{X}_{1,eq} = \frac{Z_1}{R_{11}} \quad \text{(Eq. 8)}$$

In light of the feature of a constellation diagram, the distance between each constellation point of the constellation diagram and the pinpoint $\tilde{X}_{1,eq}$ can be determined in advance.

Figure 5:
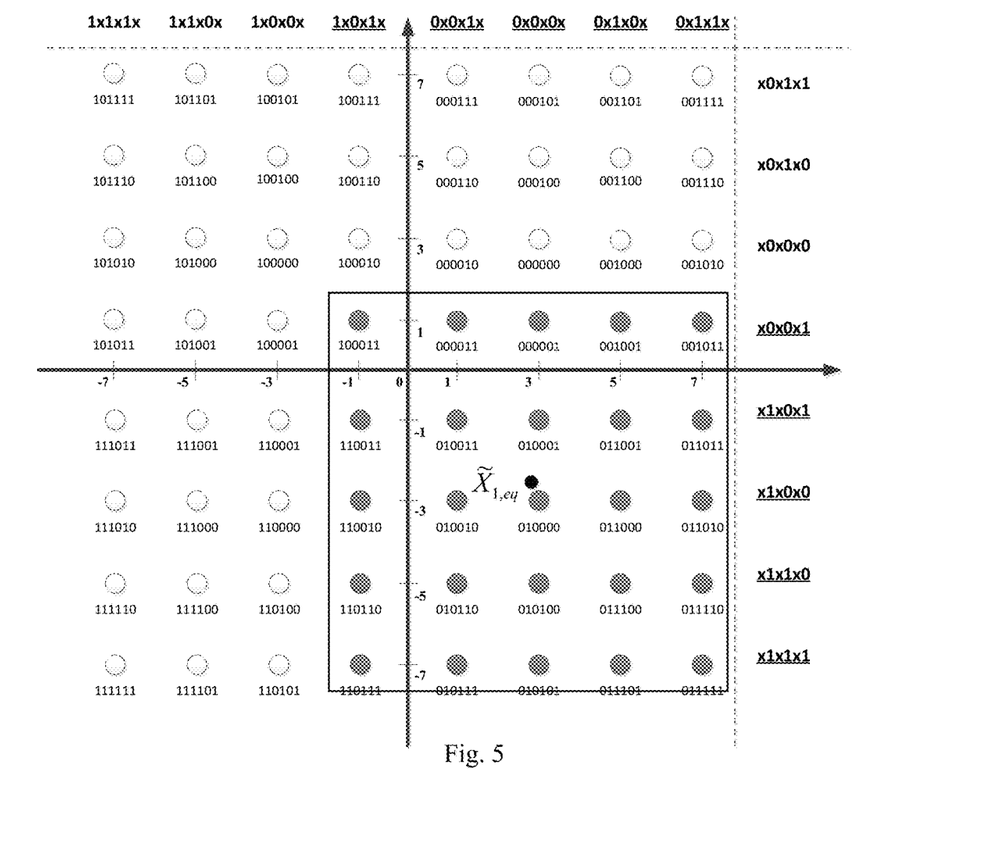
FIG. 5 illustrates an exemplary operation, which is executed by the maximum likelihood detector of FIG. 4a, with a constellation diagram.
Figure 6:
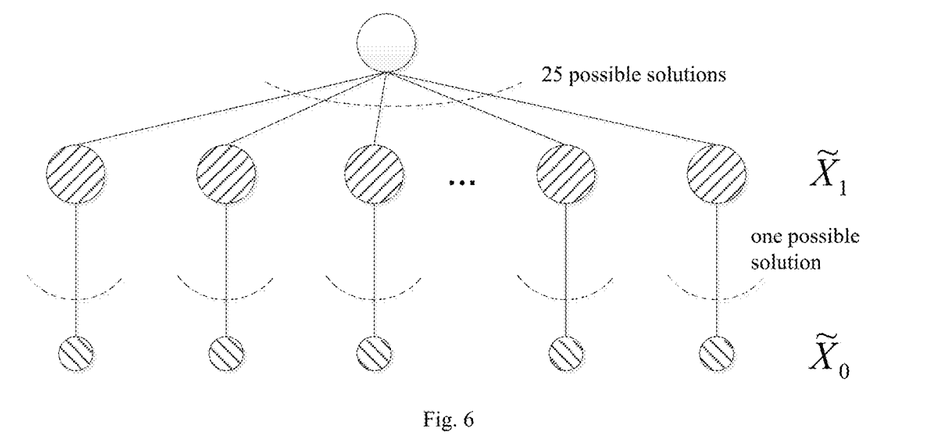
FIG. 6 shows a tree diagram associated with FIG. 5.

Take 64-QAM of LTE. Fourteen sections can be defined as shown in Table 1 below according to the relation between the locations of the pinpoint $\tilde{X}_{1,eq}$ (i.e., a reference value associated with the pinpoint $\tilde{X}_{1,eq}$) and the constellation points. In each section of Table 1, the left-to-right order indicates that the distance between a constellation point in the section and the pinpoint $\tilde{X}_{1,eq}$ gets farther by the order. With the constellation diagram of FIG. 5, the pinpoint $\tilde{X}_{1,eq}$ of $\hat{X}_1$ mapped on the constellation diagram is clearly shown, in which the symbol "x" of the digits "1x1x1x", "x0x1x1", etc. can be zero or one. In the example of FIG. 5, the real-part of $\tilde{X}_{1,eq}$ is located between the section 2≤S≤3, and the real-parts of the constellation points in the section by the close-to-far order (corresponding to the aforementioned left-to-right order) are 3, 1, 5, −1, 7, −3, −5 and −7 which amount to eight possible solutions. Similarly, the imaginary-part of $\tilde{X}_{1,eq}$ is located between the section −3≤S≤−2, and the imaginary-parts of the constellation points in the section by the close-to-far order are −3, −1, −5, 1, −7, 3, 5 and 7 which amount to eight possible solutions. Assuming that the search value selected/determined by the search value selecting circuit 410 is twenty-five (which implies that only twenty-five possible solutions of $\hat{X}_1$ (or $\hat{X}_0$) are unfolded by the ML detecting circuit 420 at the first layer), the ML detecting circuit 420 will pick five real-parts most close to the pinpoint $\tilde{X}_{1,eq}$ and five imaginary-parts most close to the pinpoint $\tilde{X}_{1,eq}$ to obtain 5×5=25 possible solutions (i.e., 25 candidate signal values) which can be understood as a search range (e.g., a range in a shape of rectangle or another form) surrounding the pinpoint $\tilde{X}_{1,eq}$ (i.e., the center), and all constellation points within this search range are the constellation points (e.g., those most close to the pinpoint $\tilde{X}_{1,eq}$) calculated by the ML detecting circuit 420 when unfolding $\hat{X}_1$ at the first layer; meanwhile, the constellation points without the search range are removed from consideration. Accordingly, the present embodiment can lower computation complexity as shown in the tree diagram of FIG. 6. It should be noted that the present embodiment may obtain the combination of the picked real-parts and imaginary-parts (i.e., the said possible solutions) through a look-up-table operation accessing pre-stored data (e.g., the data of Table 1), so as to make the ML detecting circuit 420 calculate LLR(s) according to Eq. 5 more efficiently.

TABLE 1

| S < −6 | −1 | −5 | −3 | −1 | 1 | 3 | 5 | 7 |
|---|---|---|---|---|---|---|---|---|
| −6 ≤ S < −5 | −5 | −7 | −3 | −1 | 1 | 3 | 5 | 7 |
| −5 ≤ S < −4 | −5 | −3 | −7 | −1 | 1 | 3 | 5 | 7 |
| −4 ≤ S < −3 | −3 | −5 | −1 | −7 | 1 | 3 | 5 | 7 |
| −3 ≤ S < −2 | −3 | −1 | −5 | 1 | −7 | 3 | 5 | 7 |
| −2 ≤ S < −1 | −1 | −3 | 1 | −5 | 3 | −7 | 5 | 7 |
| −1 ≤ S < 0 | −1 | 1 | −3 | 3 | −5 | 5 | −7 | 7 |
| 0 ≤ S < 1 | 1 | −1 | 3 | −3 | 5 | −5 | 7 | −7 |
| 1 ≤ S < 2 | 1 | 3 | −1 | 5 | −3 | 7 | −5 | −7 |
| 2 ≤ S < 3 | 3 | 1 | 5 | −1 | 7 | −3 | −5 | −7 |
| 3 ≤ S < 4 | 3 | 5 | 1 | 7 | −1 | −3 | −5 | −7 |
| 4 ≤ S < 5 | 5 | 3 | 7 | 1 | −1 | −3 | −5 | −7 |
| 5 ≤ S < 6 | 5 | 7 | 3 | 1 | −1 | −3 | −5 | −7 |
| 6 ≤ S | 7 | 5 | 3 | 1 | −1 | −3 | −5 | −7 |

Referring to FIG. 5, it is obvious that the scope of the search range has dominant influence on the computation complexity. When the search range includes all constellation points (i.e., sixty-four constellation points in FIG. 5), the computation complexity of the present embodiment is equivalent to the computation complexity of the aforementioned LORD configuration. In other words, the computation complexity of the present embodiment is equal to or less than the computation complexity of the LORD configuration. Of course the scope of the search range can be set in advance, and can be modified according to a communication status. When the scope of the search range is set in advance, the search value is determined by the search value selecting circuit 410 in accordance with the aforementioned predetermined value; for instance, the search value is equal to the predetermined value. When the scope of the search range is set according to the communication status, the index of the communication status (i.e., the aforementioned communication index) could be associated with at least one of a signal-to-noise ratio, sub-carrier reception signal energy strength, channel energy strength, channel correlation, channel estimation precision and interference energy strength, etc. When the modulation type is M-QAM, a non-restrictive example of the search value is an integer greater than M/4, and another non-restrictive example of the search value is an integer between 4 and $(\sqrt{M}-1)^2$ (i.e., 4≤search value≤$(\sqrt{M}-1)^2$).

On the basis of the above, when the scope of the search range is determined according to the communication status, the scope of the search range, for example, could be determined according to the signal-to-noise ratio (SNR) during the ML detecting circuit 420 executing the ZF calculation for determining the pinpoint $\tilde{X}_{1,eq}$ of $\hat{X}_1$ on the constellation diagram. The said SNR can be represented by the symbol γ, and expressed as follows:

$$\gamma = \frac{|R_{11}|^2}{\sigma_W^2} \quad \text{(Eq. 9)}$$

in which $\sigma_W^2$ stands for noise energy which can be measured in a conventional way known in this field, and $R_{11}$ is one of the elements of the aforementioned upper triangular matrix R. The greater the γ, the more reliable the ZF calculation result of the ML detecting circuit 420; in this case, the search value selecting circuit 410 may select a smaller search value (i.e., smaller search range). On the other hand, the smaller the γ, the greater the search value (i.e., the greater search range) that the search value selecting circuit 410 may choose. In light of the above, the present embodiment may define one or more threshold(s) $T_g$ (g=1, 2, ..., G), in which $T_g<T_{g+1}$. As shown in Table 2, when γ is greater than some threshold $T_g$ (e.g., $T_1$), the search value selecting circuit 410 will adopt a smaller search value (e.g., $K_2$), in which $K_{G+1}<K_G< ... <K_2<K_1$.

TABLE 2

| | |
|---|---|
| γ < $T_1$ | $K_1$ |
| $T_1 ≤ γ < T_2$ | $K_2$ |
| . | . |
| . | . |
| . | . |
| $T_g ≤ γ < T_{g+1}$ | $K_g$ |
| . | . |
| . | . |
| . | . |
| $T_G ≤ γ$ | $K_{G+1}$ |

In addition to the SNR (as shown in Eq. 9), the search value selecting circuit 410 is operable to select the search value (i.e., search range) according to other communication indexes. For instance, the search value selecting circuit 410 may select the search value according to channel correlation ρ which can be expressed as follows:

$$\rho = \frac{h_1^H h_2}{\sqrt{\|h_1\|_2^2} \sqrt{\|h_2\|_2^2}} \quad (Eq. 10)$$

In Eq. 10, $h_1$ stands for the first column of the channel response matrix $\hat{H}$ and $h_2$ stands for the second column of the matrix $\hat{H}$. The greater the ρ (i.e., the smaller the 1/ρ), the more unreliable the ZF calculation result of $\tilde{X}_1$ calculated by the ML detecting circuit 420; in this case, the search value selecting circuit 410 may select a greater search value (i.e., greater search range). On the other hand, the smaller the ρ (i.e., the greater the 1/ρ), the smaller the search value (i.e., the smaller search range) that the search value selecting circuit 410 may choose. Therefore, when the communication index (e.g., γ, 1/ρ, etc.) is above a first threshold, the search value is a first search value; when the communication index is below the first threshold, the search value is a second search value. The first search value is smaller than the second search value, and the communication status represented by the communication index above the first threshold is better than the communication status represented by the communication index below the first threshold.

Figure 7:
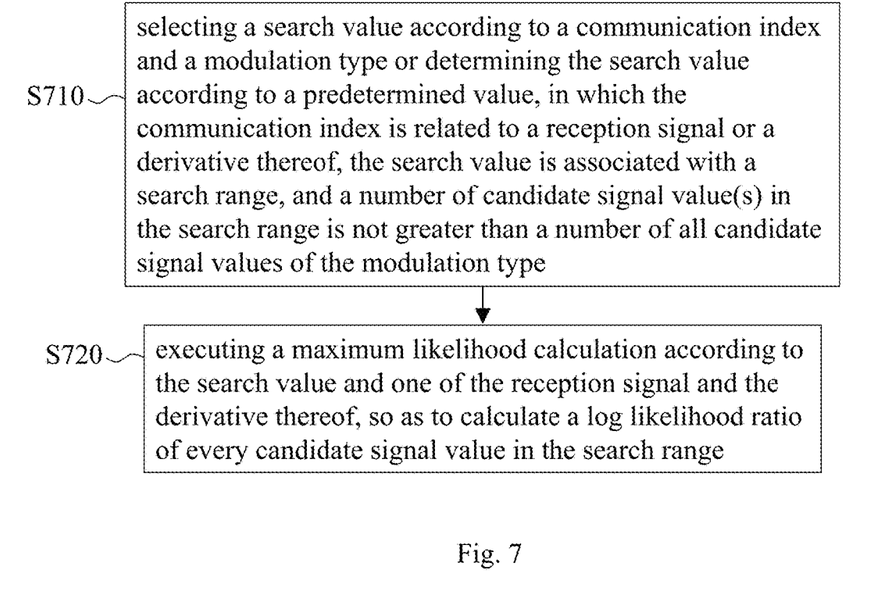
FIG. 7 illustrates an embodiment of the maximum likelihood detecting method of the present invention.

The present disclosure also includes a maximum likelihood detecting method (ML detecting method) as shown in FIG. 7. This method can be carried out by the aforementioned ML detector 152 or the equivalent thereof. An embodiment of the method comprises the following steps:

Step S710: selecting a search value according to a communication index and a modulation type or determining the search value according to a predetermined value, in which the communication index is related to a reception signal or a derivative thereof, the search value is associated with a search range, and a number of candidate signal value(s) in the search range is not greater than a number of all candidate signal values of the modulation type.

Step S720: executing a maximum likelihood calculation (ML calculation) according to the search value and one of the reception signal and the derivative thereof, so as to calculate a log likelihood ratio (LLR) of every candidate signal value in the search range.

Since those of ordinary skill in the art can appreciate the detail and modification of the method embodiment by referring to the explanation of the aforementioned device embodiments, which means that the features of each device embodiment can be applied to the method embodiment in an reasonable way, therefore repeated and redundant description is omitted while the existing disclosure is believed to be enough for understanding and enablement.

In summary, the ML detector, the ML detecting method and the wireless signal receiver with the ML detection function of the present invention can achieve low computation latency, low computation complexity and low computation power consumption while the error rate of the present invention is as low as that of the prior arts.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A maximum likelihood detector (ML detector), comprising:
    a search value selecting circuit configured to select a search value according to a communication index and a modulation type, in which the communication index is related to a reception signal or a first derivative thereof, the communication index includes at least one of a signal-to-noise ratio, sub-carrier energy strength, channel energy strength, channel correlation, channel estimation precision and interference energy strength, and the signal-to-noise ratio is inversely proportional to the search value; and
    a maximum likelihood detecting circuit (ML detecting circuit) configured to execute a maximum likelihood calculation (ML calculation) according to the search value and one of the reception signal and a second derivative thereof, so as to calculate a log likelihood ratio of every candidate signal value in a search range, wherein the search range is associated with the search value, and a number of the candidate signal values in the search range is not greater than a number of all candidate signal values of the modulation type.

2. The ML detector of claim 1, wherein the ML detecting circuit executes a zero-forcing (ZF) calculation according to the reception signal or the second derivative thereof to obtain a reference value, and then determines the search range according to the reference value and the search value so as to execute the ML calculation according to the search range.

3. The ML detector of claim 2, wherein the candidate signal values in the search range are K candidate signal values most close to the reference value among all the candidate signal values of the modulation type.

4. The ML detector of claim 2, wherein the ML detecting circuit executes a look-up-table operation according to the reference value and the search value so as to determine the candidate signal values in the search range, and thereby executes the ML calculation according to the candidate signal values in the search range.

5. The ML detector of claim 1, wherein the modulation type is quadrature amplitude modulation (QAM).

6. The ML detector of claim 1, wherein the reception signal is composed of two spatial streams, and the two spatial streams are independent of each other.

7. The ML detector of claim 1, wherein an outline of the search range in a constellation diagram corresponding to the modulation type is rectangular.

8. The ML detector of claim 7, wherein the ML detecting circuit executes a zero-forcing (ZF) calculation according to the reception signal or the second derivative thereof to obtain a reference value, and then determines the search range according to the reference value and the search value so as to execute the ML calculation according to the search range.

9. The ML detector of claim 8, wherein the candidate signal values in the search range are K candidate signal values most close to the reference value among all the candidate signal values of the modulation type.

10. The ML detector of claim 1, wherein the number of the candidate signal values in the search range is greater than one-fourth of the number of all the candidate signal values of the modulation type.

11. The ML detector of claim 1, wherein when the modulation type is quadrature amplitude modulation with a signal set of size M, the number of the candidate signal values in the search range is not less than four and not greater than $(\sqrt{M}-1)^2$.

12. The ML detector of claim 1, wherein when the communication index is above a first threshold, the search value is a first search value; and when the communication index is below the first threshold, the search value is a second search value, in which the first search value is less than the second search value, and a communication condition indicated by the communication index above the first threshold is better than a communication condition indicated by the communication index below the first threshold.

13. The ML detector of claim 1, which is included in a receiver with a spatial multiplexing function.

14. A maximum likelihood detecting method (ML detecting method), comprising:
selecting a search value according to a communication index and a modulation type, in which the communication index is related to a reception signal or a first derivative thereof, the communication index includes at least one of a signal-to-noise ratio, sub-carrier energy strength, channel energy strength, channel correlation, channel estimation precision and interference energy strength, the signal-to-noise ratio is inversely proportional to the search value, the search value is associated with a search range, and a number of candidate signal values in the search range is not greater than a number of all candidate signal values of the modulation type; and
executing a maximum likelihood calculation (ML calculation) according to the search value and one of the reception signal and a second derivative thereof.

15. The ML detecting method of claim 14, wherein the step of executing the ML calculation includes: executing a zero-forcing (ZF) calculation according to the reception signal or the second derivative thereof to obtain a reference value, and then determining the search range according to the reference value and the search value so as to execute the ML calculation according to the search range.

16. The ML detecting method of claim 14, wherein the step of executing the ML calculation includes: executing a look-up-table operation according to the reference value and the search value so as to determine the candidate signal values in the search range, and then executing the ML calculation according to the candidate signal values in the search range.

17. The ML detecting method of claim 14, wherein when the communication index is above a first threshold, the search value is a first search value; and when the communication index is below the first threshold, the search value is a second search value, in which the first search value is less than the second search value, and a communication condition indicated by the communication index above the first threshold is better than a communication condition indicated by the communication index below the first threshold.

18. The ML detecting method of claim 14, wherein when the modulation type is quadrature amplitude modulation with a signal set of size M, the number of the candidate signal values in the search range is not less than four and not greater than $(\sqrt{M}-1)^2$.

19. A wireless signal receiver with a maximum likelihood detection function (ML detection function), comprising:
a Discrete Fourier Transform (DFT) circuit configured to convert a time-domain signal into a frequency-domain signal;
a reference signal extraction circuit configured to generate an extraction reference signal according to the frequency-domain signal;
a channel estimation circuit configured to generate an estimation signal according to the extraction reference signal;
a data signal extraction circuit configured to generate an extraction data signal according to the frequency-domain signal;
a signal detecting circuit configured to generate a detection signal according to the estimation signal and the extraction data signal, the signal detecting circuit including: a maximum likelihood detector (ML detector) configured to select a search value according to a communication index and a modulation type, and configured to execute a maximum likelihood calculation (ML calculation) according to the search value and one of the frequency-domain signal and a derivative thereof to generate the detection signal, in which the communication index includes at least one of a signal-to-noise ratio, sub-carrier energy strength, channel energy strength, channel correlation, channel estimation precision and interference energy strength, the signal-to-noise ratio is inversely proportional to the search value, the search value is associated with a search range, and a number of candidate signal values in the search range is not greater than a number of all candidate signal values of the modulation type; and
a decoding circuit configured to generate a decoded signal according to the detection signal.

* * * * *